United States Patent [19]

Mercier et al.

[11] Patent Number: 4,936,361

[45] Date of Patent: Jun. 26, 1990

[54] ROTARY CUTTER

[76] Inventors: Gilles Mercier, 125, Rang 9, C.P. 1832, Senneterre, Que., Canada, J0Y 2M0; René Gélinas, 3921, 50e Avenue Grand'mére, Que., Canada; Jacques Mercier; Paul Mercier, both of 253 B rue Pierre, Val d'Or, Que., Canada, JP9 4L8

[21] Appl. No.: 399,009

[22] Filed: Aug. 28, 1989

[51] Int. Cl.⁵ ............................................. B27G 13/00
[52] U.S. Cl. ..................................... 144/221; 83/665; 144/240; 144/241; 144/34 R; 407/59; 407/62; 407/63
[58] Field of Search ............. 83/665; 144/34 R, 3 D, 144/218, 221, 240, 241; 407/59, 62, 63

[56] References Cited

U.S. PATENT DOCUMENTS

| | | | |
|---|---|---|---|
| 1,359,179 | 11/1920 | Lassiter | 407/59 |
| 1,438,184 | 12/1922 | Lewis | 144/221 |
| 1,451,079 | 4/1923 | Millsaps . | |
| 2,396,289 | 3/1946 | Ross | 407/59 |
| 2,969,816 | 1/1961 | Johnsa . | |
| 3,457,976 | 7/1969 | Andersson et al. . | |
| 3,785,417 | 1/1974 | Vora | 407/59 |
| 3,902,538 | 9/1975 | Muirhead . | |
| 3,946,474 | 3/1976 | Hahn et al. . | |
| 4,131,146 | 12/1978 | Koch | 144/221 |
| 4,790,693 | 12/1988 | Koblesky | 407/59 |

FOREIGN PATENT DOCUMENTS 1138595 12/1955 France ................... 144/221

*Primary Examiner*—W. Donald Bray

[57] ABSTRACT

A rotary cutter bar for a tree felling apparatus. The bar comprises a cylindrical rod having a plurality of raised cutting teeth on its surface. Each tooth is in the form of a short curved bar. The teeth are located on a plurality of equally spaced-apart, spiral paths extending about the cylindrical surface of the rod from one end to the other. The spiral paths extend at an angle of between 30° and 60° to the longitudinal axis of the rod.

12 Claims, 2 Drawing Sheets

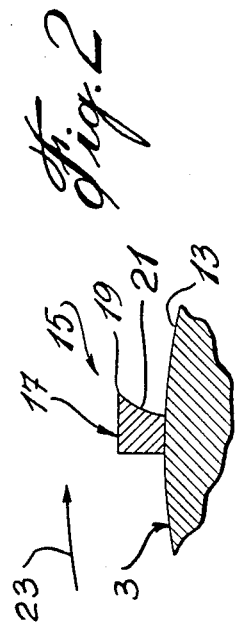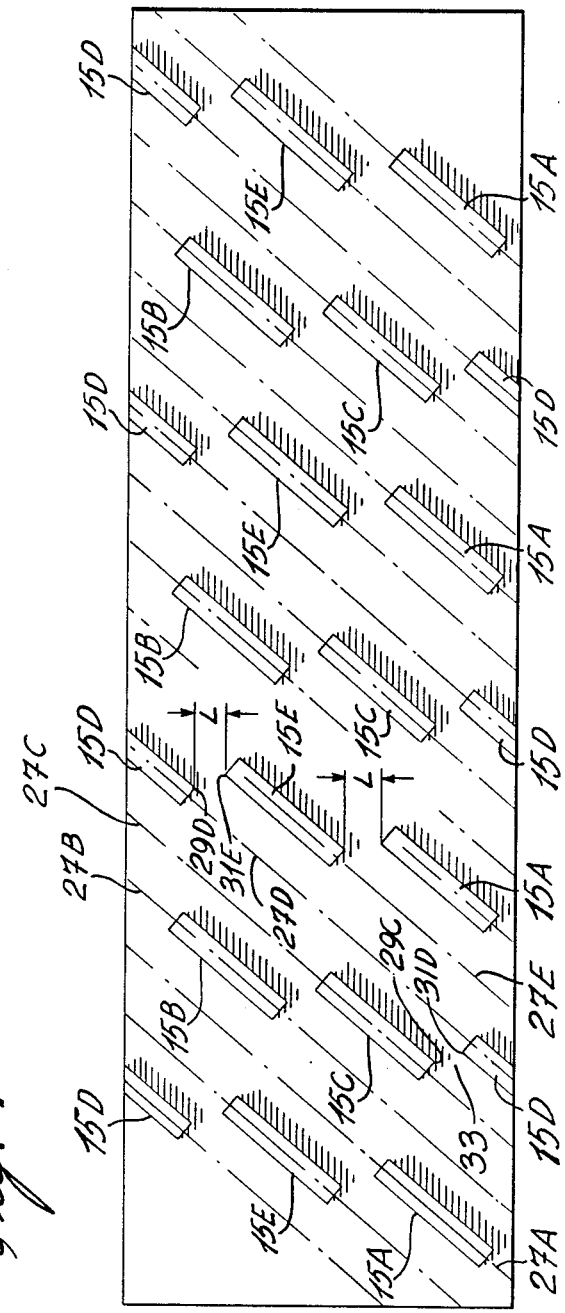

ROTARY CUTTER

BACKGROUND OF THE INVENTION

1. Field of the Invention

This invention is directed toward an improved cutter bar for use in felling heads on tree harvesting machines.

2. Description of the Prior Art

Tree harvesting machines have normally employed shears or saws to cut through trees being harvested. Both devices have disadvantages however. It has been proposed to use cylindrical cutter bars, rotating about their longitudinal axis, to cut through trees. Such cutter bars are lighter in weight and have lower power requirements than the shear or saw arrangements.

The known cutter bars have their own disadvantages however. The initial cutter bars used had teeth extending across the cylindrical surface of the bar in a direction parallel to the longitudinal axis of the bar. As each tooth began cutting, the tooth exerted a reactive force on the felling head raising or lowering it depending on the direction of rotation of the bar. This presented problems in getting a strain cut across the tree and also resulted in vibration causing heavy wear on the bearings supporting the cutter bar during rotating and cutting.

To minimize the vibration and wear problems encountered using straight cutting teeth it has been proposed to use one or more cutting teeth formed in continuous spirals over the cutter bar. Such teeth minimize vibration and reduce wear on the bearings. However it is difficult to expel the chips from these cutter bars particularly when cutting through large trees. The cutter bars with continuous spiral teeth have a tendency to plug up and the cutting operation must be interrupted to clean the teeth.

SUMMARY OF THE INVENTION

It is the purpose of the present invention to provide a cutter bar having an improved tooth arrangement which minimizes chip plugging while still providing a smooth, chatter-free cutting action.

In accordance with the present invention, a cutter bar is provided having teeth thereon which follow spiral paths along the cutter bar. The teeth are spaced apart along each spiral path and the leading end of each tooth is circumferentially spaced a short distance from the trailing end of a tooth on a preceding adjacent spiral path. This arrangement appears to cause the chips to be more easily expelled from the cutter bar, thereby minimizing chip plugging.

The spiral paths on which the teeth are located extend at an angle of between 30° and 60° to the longitudinal axis of the bar. This angulation of the teeth minimizes bearing wear. The teeth on the spiral paths are also arranged to have one set of teeth on one spiral path cutting before another set of teeth on another spiral path is finished cutting. This provides a smooth, even cutting action.

The invention is particularly directed toward a cutter bar having a cylindrical rod with a plurality of raised cutting teeth on the rod. Each tooth is in the form of a short curved bar located along one of a plurality of equally spaced-apart spiral paths extending about the cylindrical surface of the rod from one end of the rod to the other. Each spiral path extends at an angle of between 30° and 60° to the longitudinal axis of the rod. Each spiral path carries a number of spaced-apart cutting teeth.

BRIEF DESCRIPTION OF THE DRAWINGS

FIG. 2 is a cross-section view taken along line 2—2 in FIG. 1;

FIG. 4 is a developed plan view of the cylindrical surface of the cutter bar shown in FIG. 3.

DESCRIPTION OF THE PREFERRED EMBODIMENTS

Figure 1:
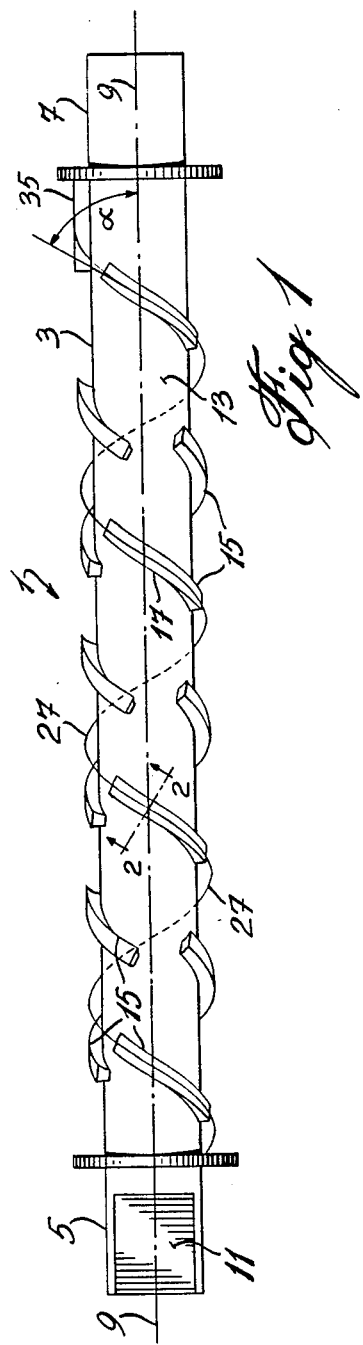
FIG. 1 is a plan view of the cutter bar.

The cutter bar 1 of the present invention, as shown in FIG. 1, has a cylindrical rod 3. The rod 3 is adapted to be mounted at its end portions 5, 7 in suitable bearings (not shown) for rotation about its longitudinal axis 9. One of the end portions 5 is flattened as shown at 11 to provide a driving surface for use in rotating the rod.

Mounted on the cylindrical surface 13 of the rod 3 are a plurality of substantially identical teeth 15. Each tooth 15 is in the form of a short curved length of bar 17. The bar 17 has a generally quadratic cross-sectional shape. One free edge 19 of the bar 17, facing in the direction of rotation of the rod, forms the cutting edge of the tooth as shown in FIG. 2. The forward surface 21 of the bar 17 is curved back from the edge 19 to provide a relatively sharp cutting edge. The bar 17 is welded on the cylindrical surface 13 of the rod 3 with its cutting edge 19 facing in the direction of rotation of the cutter bar 1 as shown by the arrow 23.

Each tooth 15 is shaped to follow a portion of one of a plurality of identical, equally-spaced apart, spiral paths extending about the cylindrical surface 13 of the rod 3. Each spiral path 27, one of which is shown in FIG. 1, extends at an angle $\alpha$ to the longitudinal axis 9 of the rod 3. This angle $\alpha$ can be between 30° and 60° depending on the type of tree being cut. Preferably, the harder the tree, the smaller the angle. For cutting spruce, one of the most common trees harvested in Eastern Canada, and a tree which is relatively soft, an angle of about 55° is preferred, as shown. With the cutting teeth 15 extending at an angle $\alpha$ of about 55°, a major portion of the cutting force on the cutting rod is transmitted axially. Thrust bearings (not shown) which mount the cutter bar 1 can absorb this axial force.

Figure 3:
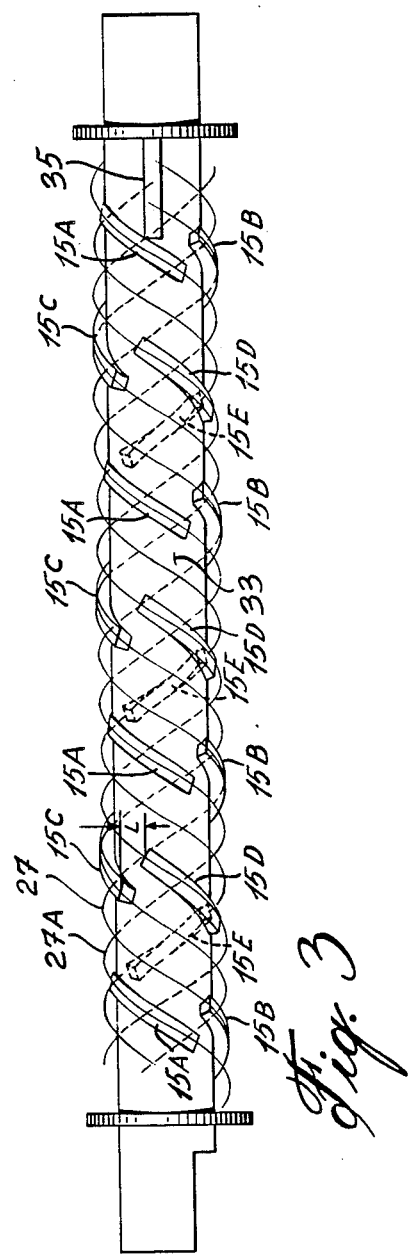
FIG. 3 is a plan view of the cutter bar, similar to FIG. 1, showing all the imaginary spiral paths on each the cutting teeth are located.

A number of teeth 15 are mounted on each spiral path 27, depending on the length and diameter of the cutter rod 3 and the angle $\alpha$. For a typical cutter rod 3, having a working length of about twenty one inches, a diameter of about two inches, and a spiral path angle $\alpha$ of about 55° there would be three or four teeth on each spiral path depending where along the path the first tooth is located. The working length of the cutter rod is that length covered with teeth. For a typical cutter bar as shown in FIGS. 3 and 4 there are five spiral paths provided, 27A, 27B, 27C, 27D and 27E. Spiral path 27A has four teeth 15A on its path. Spiral paths 27B, 27C, 27D and 27E have three teeth 15B, 15C, 15D and 15E respectively on each of their paths. Teeth 15B are shown in dotted lines in FIG. 3.

The teeth on each spiral path are arranged to have their leading ends spaced a short distance circumferentially from the trailing end of the teeth on the preceding adjacent spiral. Thus, for example, the leading end 29C on each tooth 15C located on spiral path 27C is spaced a short distance "L" circumferentially from the trailing end 31D of the preceding teeth 15D located on adjacent spiral path 27D. This provides an enlarged area 33 immediately following the trailing end 31 of each tooth which is believed to enhance chip flow and minimize plugging. The chip just cut by tooth 15D has space to expand slightly in area 33 and loosen so it can be expelled into the saw kerf being formed behind the rotary cutter bar 1 as the bar cuts through the tree.

The teeth are also made long enough to ensure that one set of teeth will commence cutting before another set finishes cutting. Thus the teeth are made long enough in the cutter shown to extend over approximately one hundred and twenty degrees of the circumference of the rod. With this length, even though each tooth is circumferentially spaced from a preceding tooth on an adjacent path, there are teeth on one spiral path that start cutting before the teeth on another spiral path finish cutting. In the cutter shown, the teeth on every second following spiral path start cutting before the teeth on any one spiral path have finished cutting. By way of example, before teeth 15A on spiral path 27A finish cutting, the teeth 15C on spiral path 27C start cutting. This ensures a smooth, even cutting action.

The cutter bar 1 is preferably provided with a short straight tooth 35 at its discharge end 37. The straight tooth 35 is mounted on the cylindrical surface 13 of rod 3 to extend parallel to the longitudinal axis 9 of rod 3. The tooth 35 aids in breaking up and expelling the chips that are not expelled radially from the bar and that reach the discharge end 37 of the cutter bar. More than one tooth 35 can be provided at the discharge end 37 of the cutter bar 1.

While the cutter bar 1 has been described as having five spiral paths on which the cutting teeth are located, more or less paths can be used.

I claim:

1. A cutter bar for a tree felling apparatus comprising:
   a cylindrical rod;
   a plurality of raised cutting teeth on the rod;
   each tooth in the form of a short, curved bar located along one of a plurality of equally spaced-apart, identical spiral paths extending about the surface of the rod from one end to the other;
   each spiral path extending at an angle of between 30° and 60° to the longitudinal axis of the rod;
   each spiral path carrying a number of cutting teeth, the teeth on each spiral path spaced apart from each other in the longitudinal direction of the rod.

2. A cutter bar as claimed in claim 1 wherein each tooth on one spiral path is overlapped by the closest tooth on the next adjacent spiral path, the overlapping occurring in a longitudinal direction parallel to the longitudinal axis of the rod.

3. A cutter bar as claimed in claim 2 wherein the leading ends of the teeth on each spiral path are spaced a short distance circumferentially from the trailing ends of the teeth on the preceding, adjacent spiral path so as to provide an enlarged space immediately following the trailing end of each tooth which enhances chip flow and minimizes plugging.

4. A cutter bar as claimed in claim 1 wherein each tooth extends over an arc of about 120° of the circumference of the rod.

5. A cutter bar as claimed in claim 4 wherein each spiral path has teeth located on it at the same radial location along the path so that the teeth on each spiral path are aligned in a longitudinal direction of the rod.

6. A cutter bar as claimed in claim 3 wherein each tooth extends over an arc of about 120° of the circumference of the rod.

7. A cutter bar as claimed in claim 6 wherein each spiral path has teeth located on it at the same radial location along the path so that the teeth on each spiral path are aligned in a longitudinal direction of the rod.

8. A cutter bar as claimed in claim 1 including a short, straight, longitudinally-extending tooth on the rod at the one end of the bar from which chips are discharged.

9. A cutter bar as claimed in claim 2 wherein there are at least three spiral paths, and the teeth on each spiral path are overlapped by the teeth on a second spiral path in a circumferential direction of the rod so as to have the teeth on the second spiral path start cutting before the teeth on the one spiral path are finished cutting.

10. A cutter bar for tree felling apparatus comprising:
    a cylindrical rod;
    a plurality of raised cutting teeth on the rod;
    each tooth in the form of a short, curved bar located along one of a plurality of equally spaced-apart, identical spiral paths extending about the surface of the rod from one end to the other;
    each spiral path extending at an angle of between 30° and 60° to the longitudinal axis of the rod;
    each spiral path having teeth located on it at the same radial location along the path so that the teeth on each path are aligned in a longitudinal direction of the rod;
    each tooth extending over an arc of about 120° of the circumference of the rod.

11. A cutter bar as claimed in claim 10 including a short, straight, longitudinally-extending tooth on the rod at the one end of the bar from which chips are discharged.

12. A cutter bar as claimed in claim 10 wherein there are at least three spiral paths, and the teeth on each spiral path are overlapped by the teeth on a second spiral path in a circumferential direction of the rod so as to have the teeth on the second spiral path start cutting before the teeth on the one spiral path are finished cutting.

* * * * *